United States Patent [19]

Harris

[11] 4,095,177

[45] June 13, 1978

[54] TRANSDUCER

[75] Inventor: Geoffrey John Harris, Burton, England

[73] Assignee: Square D Company, Park Ridge, Ill.

[21] Appl. No.: 747,468

[22] Filed: Dec. 3, 1976

Related U.S. Application Data

[63] Continuation of Ser. No. 613,827, Sep. 16, 1975, abandoned, which is a continuation of Ser. No. 471,411, May 20, 1974, abandoned.

[30] Foreign Application Priority Data

May 29, 1973 United Kingdom ............... 25587/73

[51] Int. Cl.² ........................ G01P 3/46; H02K 17/42
[52] U.S. Cl. ..................................... 324/164; 310/171
[58] Field of Search ................. 324/164; 310/168, 171

[56] References Cited

U.S. PATENT DOCUMENTS 3,178,641  4/1965  Varterasian ........................... 324/164

FOREIGN PATENT DOCUMENTS 1,157,500  5/1958  France ................................. 324/164
758,835  12/1952  Germany ............................ 324/164
168,947  2/1965  U.S.S.R. .............................. 324/164

Primary Examiner—John K. Corbin
Assistant Examiner—Rolf Hille
Attorney, Agent, or Firm—Norton Lesser; Richard T. Guttman

[57] ABSTRACT

A transducer to monitor velocity and direction of movement having a magnetic core with at least three spaced apart poles. Two of the poles include coils which are wired series aiding for connection to an input alternating voltage, which upon current flow create a magnetic field intersecting the path of movement of an object being monitored. The third pole includes a coil in which an alternating output voltage is induced when the monitored object moves. The magnitude of such output voltage varies with the rate of speed of the monitored object. The phase relationship of output voltage to input voltage varies with the direction in which the monitored object moves. The coil in the third pole is connected to responsive means to receive the output signal and control, or indicate, the speed as well as the direction of movement of the monitored object.

3 Claims, 8 Drawing Figures

TRANSDUCER

This is a continuation of application Ser. No. 613,827, filed Sept. 16, 1975, now abandoned which in turn is a continuation of Ser. No. 471,411, filed May 20, 1974 now abandoned.

BACKGROUND OF THE INVENTION

Prior devices for monitoring speed and direction of movement have required a mechanical or electrical connection to the monitored object which is not necessary in the present invention disclosed herein.

A device disclosed in British Pat. No. 1,306,699 is a partial advance in the art, but it still requires some mechanical connection to whatever is being monitored. It requires a special electrically conducting rotary wheel, for example, mechanically coupled to the vehicle wheel or other object that is being monitored. It cannot determine direction of motion, linear movement of any kind, nor rotary velocity, but only rotary acceleration or deceleration. The present invention can monitor and determine all such movements. The present invention does not require a similar rotary wheel, or any equivalent element at all. It is also adapted to take advantage of the special complex characteristics of an alternating voltage source as explained below, in contrast to the direct voltage source utilized in the British patent.

SUMMARY OF THE INVENTION

It is an object of the invention disclosed herein to provide a transducer to monitor velocity and direction of movement, comprising electromagnetic means requiring no mechanical or electrical connection to the monitored object.

It is an object of the invention to provide a transducer to determine direction of movement and velocity of linear as well as angular motion.

It is an object of the invention to provide a transducer to monitor velocity and directon of movement, comprising a magnetic core having at least three spaced apart poles in facing relationship with the path of movement of a monitored subject, two of such poles having coils wired series aiding for connection to an alternating voltage supply, the third pole having a coil for inducing therein an output voltage connected to signal responsive means for controlling, or indicating, the speed as well as the direction of movement of the monitored subject.

Other objects and advantages of this invention will be apparent from the following detailed description and accompanying drawings.

DETAILED DESCRIPTION OF PREFERRED EMBODIMENT

Figure 1:
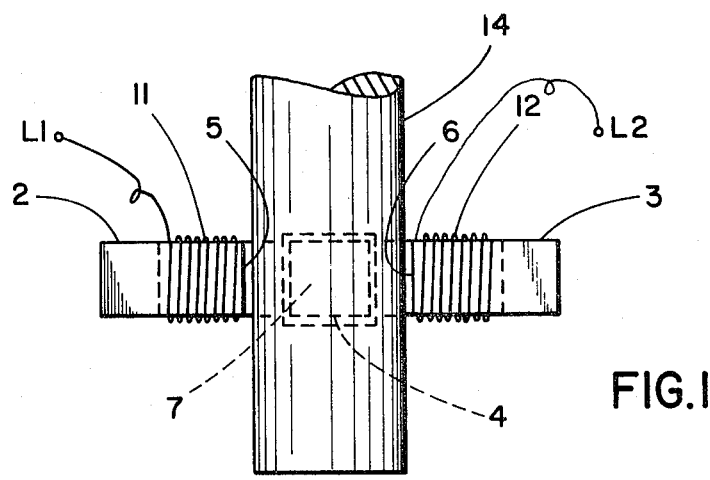
FIG. 1 is a diagrammatic plan of a velocity and directional transducer in accordance with this invention shown in position to monitor movement of a cylindrical shaft.
Figure 2:
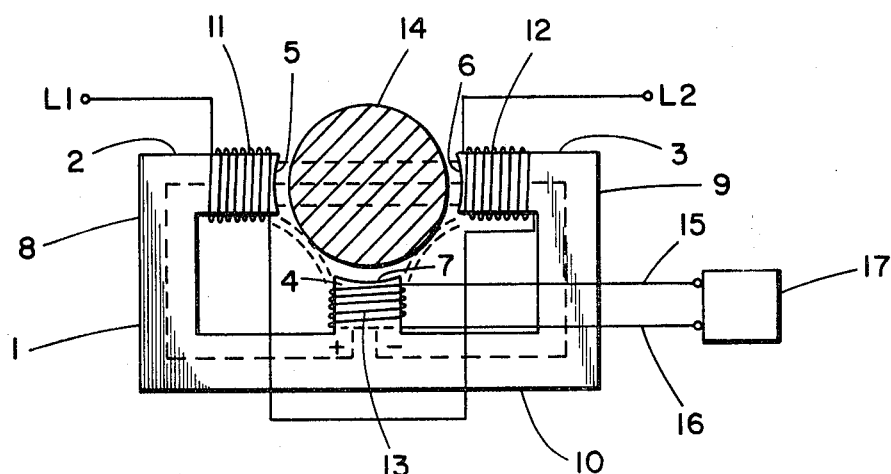
FIG. 2 is a diagrammatic elevation view of FIG. 1 showing the cylindrical shaft in section, magnetic flux in broken lines and the coil on the center pole obscured in FIG. 1.
Figure 3:
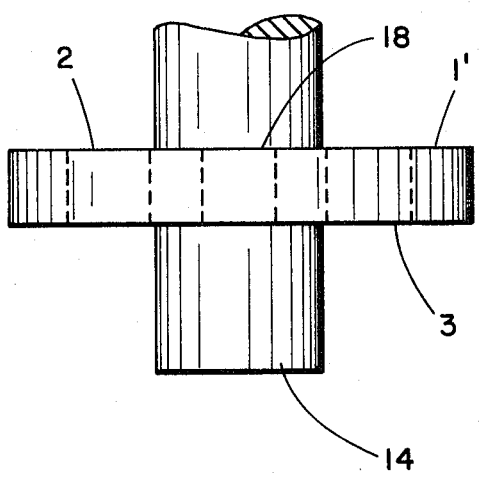
FIG. 3 is a diagrammatic plan of a modified velocity and directional transducer shown in position to minitor movement of a cylindrical shaft.

Referring to FIGS. 1 and 2 of the drawings, a velocity and directional transducer comprises a core 1 formed of magnetic steel laminations and having poles 2, 3 and 4. The core 1 is substantially E-shaped, including a C-shaped member wherein the face 5 of pole 2 and face 6 of pole 3 on outer legs 8 and 9 are positioned to face directly opposite one another. Pole 4 on center leg 10 and its face 7 are displaced by an angle of 90° from pole 2 and pole 3.

The faces 5, 6 and 7 of poles 2, 3 and 4 are each concave, to be complementary in shape to a conductive cylindrical shaft 14 which may be magnetic or nonmagnetic The core 1 is positioned with respect to shaft 14 so pole faces 5, 6 and 7 are spaced near and equi-distantly from the wall of cylindrical shaft 14, the aligned axis of pole faces 5 and 6 bisecting cylindrical shaft 14 laterally, and the extended axis of pole face 7 bisecting cylindrical shaft 14 normal to such aligned axis.

Pole 2 includes a coil 11 wound thereon, and connected series aiding to coil 12 wound on pole 3, said coils being connected to and alternating voltage source of sine wave form indicated by conductors L1 and L2 in FIG. 2 to energize said coils. The resultant current produces an alternating magnetic flux between pole faces 5 and 6 which passes through and around cylindrical shaft 14.

Pole 4 includes a sensing coil 13 for connection through conductors 15 and 16 to a responsive sensing device 17 capable of receiving an electrical signal and acting thereon.

When shaft 14 is stationary, and coils 11 and 12 are energized by said alternating voltage source, the polarity of magnetism around the core 1 is such as to be balanced and cancelled at pole 4. The result is that no power frequency alternating voltage is induced in the sensing coil 13 around pole 4. A small residual harmonic voltage is present, but this is relatively small. Pole 4 is positioned on core 1 at a point of magnetic equilibrium with respect to poles 2 and 3 when the latter are energized by an alternating voltage source and when the magnetic field between poles 2 and 3 is not displaced by movement of another body therein.

When shaft 14 rotates, and coils 11 and 12 are energized by said alternating voltage source, magnetic imbalance occurs at pole 4 thereby inducing a voltage in coil 13 of the same frequency as the source voltage. The degree of magnetic imbalance at pole 4 depends on the speed of rotation of shaft 14. The amplitude of output voltage from coil 13 to said responsive sensing device 17 is therefore dependant on the speed of rotation of shaft 14.

The material of shaft 14 may be considered as being of many elemental current paths, and therefore the result of the alternating magnetic field between pole faces 5 and 6 when energized will be to cause (due to transformer action) alternating currents at power frequency to circulate within the material, the direction of current flow being 90°, spatially, with respect to the applied flux field. This current will cause a second induced magnetic flux field to be set up, the direction being such as to oppose the applied magnetic field. The resultant flux distribution around the core and shaft remains balanced while the shaft is stationary. Under shaft rotating conditions, the applied and induced flux fields become displaced relative to the another, such that the resultant leakage flux between poles 2 and 4 is unbalanced with respect to that appearing between poles 3 and 4. Conditions at pole 4 are now such that due to the magnetic imbalance, a component of flux is present which will cause an output voltage to be induced in coil 13 of pole 4, the frequency of which is the same as that of the alternating voltage source.

The phase relationship of the output voltage with respect to the applied power voltage is dependent upon which direction shaft 14 is rotating, being either in phase when rotation is in one direction or 180 electrical degrees out of phase when rotation is in the opposite direction. For example, if rotation in one direction causes greater flux leakage between pole 2 and pole 4 so as to induce a voltage in pole 4, the induced voltage in coil 13 around pole 4 will be negative when pole 2 is positive and its opposite pole 3 is negative. Rotation in the opposite direction to cause greater flux leakage between pole 3 and pole 4, will induce a voltage in coil 13 which is positive (or opposite polarity compared to rotation in the first direction) when pole 2 is positive and pole 3 is negative. In other words, when poles 2 and 3 have a given polarity, induced voltage at pole 4 may be either positive or negative depending on direction of rotation of the test object. If the induced or output voltage is in phase when pole 4 is negative (caused by rotation in one direction), it must be 180° out of phase when pole 4 is positive (caused by movement in the opposite direction). Thus, by monitoring the phase relationship between the output voltage and the applied voltage, the direction of movement of a test object in the magnetic field between poles 2 and 3 can be determined.

Figure 4:
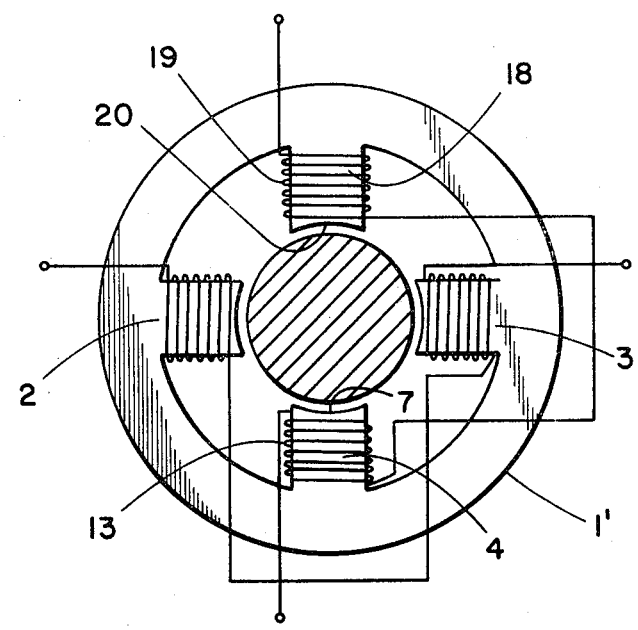
FIG. 4 is a diagrammatic elevation view of the modified transducer in FIG. 3 with the shaft in section.

The sensitivity of the unit may be improved by a modified core 1' which includes an additional pole 18 with a sensing coil 19 thereon, physically displaced from pole 4 and coil 13 by 180° as shown in FIG. 4. The coils 13 and 18 are connected series aiding and in turn connected to a responsive sensing device to either control or indicate speed and direction of movement of a shaft or other subject being monitored.

A problem which occurs when this type of transducer is used to monitor a mechanicl shaft of ferrous material is that unless the shaft is completely non-eccentric and vibration free, a large residual output voltage will be obtained when the shaft is rotated slowly. This voltage will mask the true slow speed output, although at higher shaft speeds the speed signal predominates.

In order that a useful output be obtained at slow shaft speeds it is desirable to reduce the shaft to pole face air gap to a minimum. This further aggravates the eccentricity problem as the relatively high permeability of the shaft material concentrates the flux distribution within the shaft, and therefore the output signal obtained with shaft to pole displacement is very sensitive to the eccentricity.

Figure 5:
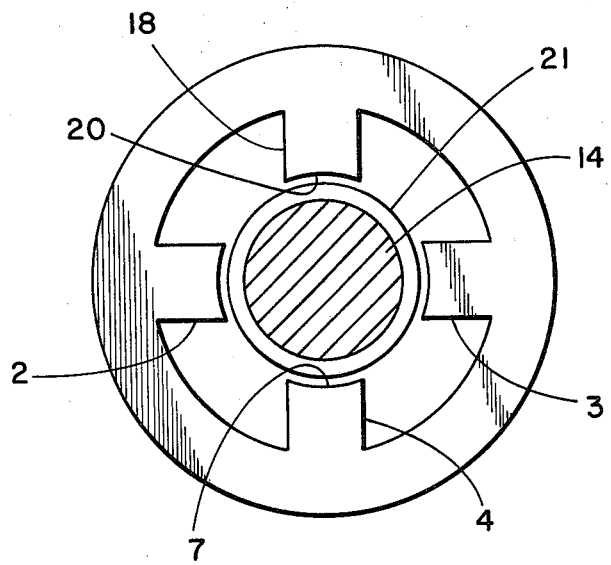
FIG. 5 is an elevation view of the transducer of FIG. 3 showing the shaft in section of including a non-ferrous collar on the shaft.
Figure 6:
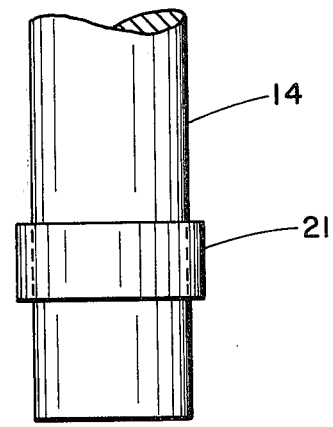
FIG. 6 is a plan view of the shaft and collar in FIG. 5.

To reduce this problem, a non-ferrous sleeve 21 (see FIGS. 5 and 6) may be fitted to the shaft 14 to increase the gap between the ferrous shaft 14 and pole faces 7 and 20. At the same time, the air gap between these pole faces and the non-ferrous sleeve 21 is reduced to a minimum to achieve a useful output voltage at slow speeds without the ferrous shaft having such a large effect on the residual output signal.

Figure 7:
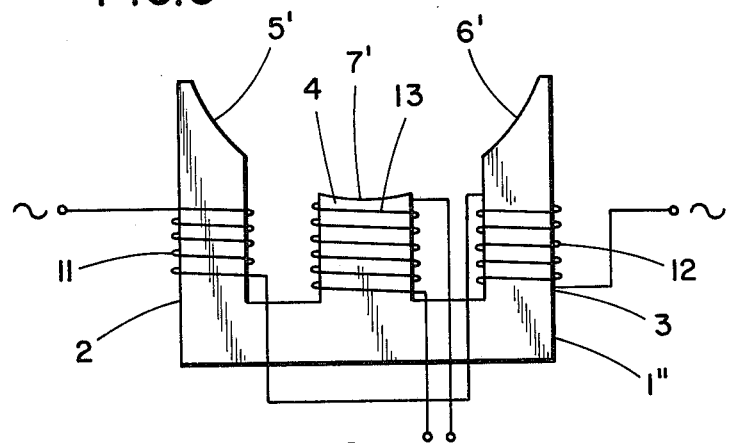
FIG. 7 is a diagrammatic elevaton view of another modified transducer adapted to minotor movement of a large diameter subject such as a flywheel.

When it is desired to determine the rotational speed or direction of shafts of large diameter, e.g. flywheels, a modified core 1" is provided as shown in FIG. 7, having pole faces 5', 6' and 7' shaped to conform to a much smaller part of the circumference of the monitored subject.

Figure 8:
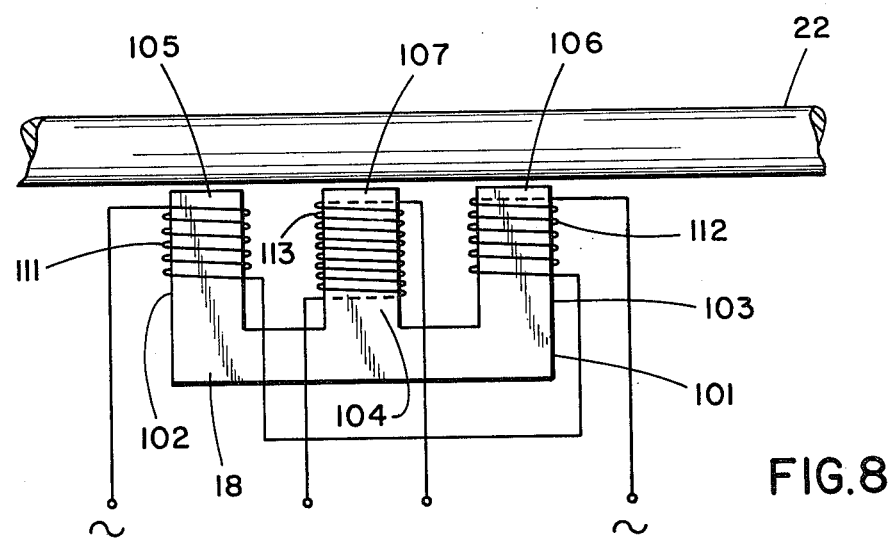
FIG. 8 is a diagrammatic elevation view of another modified transducer shown in position to monitor movement of a linear moveable subject.

This invention can also be used to measure linear speed and direction of movement of a rod 22 or other elongated object of ferrous or non-ferrous material. To achieve this, a further modified core 101 is provided as shown in FIG.8, having pole faces 105, 106 and 107. Coils 111 and 112 are energized by an alternating voltage source creating an alternating magnetic field in the gap between pole faces 105 and 106 which extends into and adjacent elongated rod 22. While the rod 22 is stationary, core 101 is in a balanced magnetic condition at pole 104 and no output voltage is induced in coil 113. When rod 22 moves axially and across pole faces 105 and 106, the applied flux field becomes displaced relative to the flux field induced by current flow in rod 22 (due to transformer action as previously described with reference to cylindrical shaft 14). As these flux fields become displaced, the resultant leakage flux between poles 102 and 104, and that between 103 and 104, becomes imbalanced causing an output voltage to be induced in coil 113 on pole 104.

Similarly, as described previously with respect to cylindrical shaft 14 being monitored for rotational movement by another embodiment of this invention, the phase relationship of the output voltage with respect to the applied power voltage is dependant on the direction the rod 22 is moving, being either in phase when movement is in one axial direction or 180° electrical degrees out of phase when movement is in the opposite axial direction. By connecting coil 113 to a sensing device responsive to changes in phase relationships, the direction of movement can be determined for control purposes or for indicating such direction of movement.

It will be observed that there is no mechanical or electrical connection to the monitored subject, and it is not necessary to attach anything to, or modify the monitored subject in anyway, except for fitting a non-ferrous sleeve on a ferrous shaft if desired.

The responsive sensing device 17 may be a voltage meter responsive to amplitude of induced voltage to indicate the speed of movement of a test object, or a voltage relay well known in the art which opens or closes at a certain voltage to control the speed of movement. The responsive sensing device may include a phase detecting circuit such as described in U.S. Pat. No. 3,783,354 to determine and indicate the phase relationship between one circuit and another, and may include a power relay circuit controlled by a silicon-controlled rectifier (SCR) responsive to change in phase relationship as also disclosed in said patent. Thus direction of movement of a test object which is a function of phase relationship between input and output voltage can be both indicated and controlled by much responsive sensing device.

I claim:

1. An electromagnetic sensing assembly for detecting the rotation of a metal shaft having a uniform arcuate surface of any one of a plurality of different diameters and rotatable about an axis coaxial with said surface, the improvement comprising:

an E shaped ferrous stator defining a pair of spaced outer poles and an intermediate pole with each outer pole having an outer free end in closely spaced relationship to the outer free end of the intermediate pole, each pole having an end surface with the end surface of each outer pole spaced from the end surface of each other outer pole by a distance substantially less than said different diameters, means for adjustably spacing the end surfaces of said poles adjacent said uniform arcuate surface with the angular spacing between the end surface of said intermediate pole and each end surface of said outer poles subtending an arc of said uniform arcuate surface substantially less than 90° and spaced a substantially uniform small distance from said surface, a generating coil on each of said outer legs, means for connecting each generating coil in series with each other generating coil to a common source of alternating current to generate a respective magnetic field in series aiding relationship with each field extending through a respective portion of said shaft between the free end of each outer pole and the free end of said intermediate pole, and a detecting coil on said intermediate pole for detecting an alternating current voltage proportional to the velocity of rotation of said shaft in response to rotation of said shaft and the presence of each said respective magnetic field.

2. The assembly claimed in claim 1 in which the phase of said detected alternating current voltage corresponds to the direction of rotation of said shaft.

3. The assembly claimed in claim 2 in which the free ends of said outer poles are spaced equally from the free end of said intermediate pole and the free ends of said poles are formed along a common arc extending less than 180°.

* * * * *

UNITED STATES PATENT AND TRADEMARK OFFICE
CERTIFICATE OF CORRECTION

PATENT NO. : 4,095,177
DATED : June 13, 1978
INVENTOR(S) : Geoffrey John Harris

It is certified that error appears in the above-identified patent and that said Letters Patent are hereby corrected as shown below:

Column 2, line 27, Should have --.-- after "magnetic";

Column 3, line 4, after "being" add --at--;

Column 3, line 11, should be --relative to one-- instead of "relative to the";

Column 3, line 55, change "mechanicl" to --mechanical--;

Signed and Sealed this

Thirteenth Day of November 1979

[SEAL]

Attest:

RUTH C. MASON
Attesting Officer

LUTRELLE F. PARKER
Acting Commissioner of Patents and Trademarks